(12) United States Patent
Gloss et al.

(10) Patent No.: US 10,362,463 B1
(45) Date of Patent: Jul. 23, 2019

(54) SYSTEM AND METHOD FOR PROVIDING NEAR-FIELD COMMUNICATION WITHIN A VEHICLE

(71) Applicant: Honda Motor Co., Ltd., Tokyo (JP)

(72) Inventors: Brandon E. Gloss, Columbus, OH (US); Andrew R. Hoover, West Liberty, OH (US); Jason Dutter, Marysville, OH (US); Jeongkyo Seo, Anyang-si (KR); Jaesoon Kwon, Siheung-si (KR); SooHwan Yim, Gimpo-si (KR)

(73) Assignee: Honda Motor Co., Ltd., Tokyo (JP)

( * ) Notice: Subject to any disclaimer, the term of this patent is extended or adjusted under 35 U.S.C. 154(b) by 8 days.

(21) Appl. No.: 15/990,025

(22) Filed: May 25, 2018

(51) Int. Cl.
| | |
|---|---|
| *H04B 5/00* | (2006.01) |
| *H04W 4/48* | (2018.01) |
| *H01Q 1/32* | (2006.01) |
| *H01Q 1/38* | (2006.01) |
| *H04B 5/02* | (2006.01) |

(52) U.S. Cl.
CPC ............... *H04W 4/48* (2018.02); *H01Q 1/32* (2013.01); *H01Q 1/38* (2013.01); *H04B 5/02* (2013.01)

(58) Field of Classification Search
CPC .. H04W 4/48; H01Q 1/32; H01Q 1/38; H04B 5/02

USPC ........................................................ 455/41.1
See application file for complete search history.

(56) References Cited

U.S. PATENT DOCUMENTS

| | | | | |
|---|---|---|---|---|
| 2006/0220857 | A1* | 10/2006 | August | G06K 17/00 340/572.1 |
| 2011/0163882 | A1* | 7/2011 | August | A01K 11/004 340/573.1 |
| 2016/0292560 | A1* | 10/2016 | Ayatollahi | G06K 19/0726 |
| 2016/0300417 | A1* | 10/2016 | Hatton | G07C 9/00857 |
| 2017/0242428 | A1* | 8/2017 | Pal | H04W 4/90 |
| 2017/0331936 | A1* | 11/2017 | Juzswik | H04W 4/80 |
| 2018/0097928 | A1* | 4/2018 | Pandurangarao | H04M 1/6075 |

* cited by examiner

*Primary Examiner* — Edward F Urban
*Assistant Examiner* — Max Mathew
(74) *Attorney, Agent, or Firm* — Rankin, Hill & Clark LLP

(57) ABSTRACT

A communication system for a vehicle that includes a near-field communication (NFC) antenna module mounted to a support structure of the vehicle. The communication system also includes a printed circuit board (PCB) that is disposed within the NFC antenna module. The communication system additionally includes a NFC transceiver that is disposed on the PCB. The communication system further includes a NFC antenna that is operably connected to the NFC transceiver and is disposed on the PCB.

20 Claims, 11 Drawing Sheets

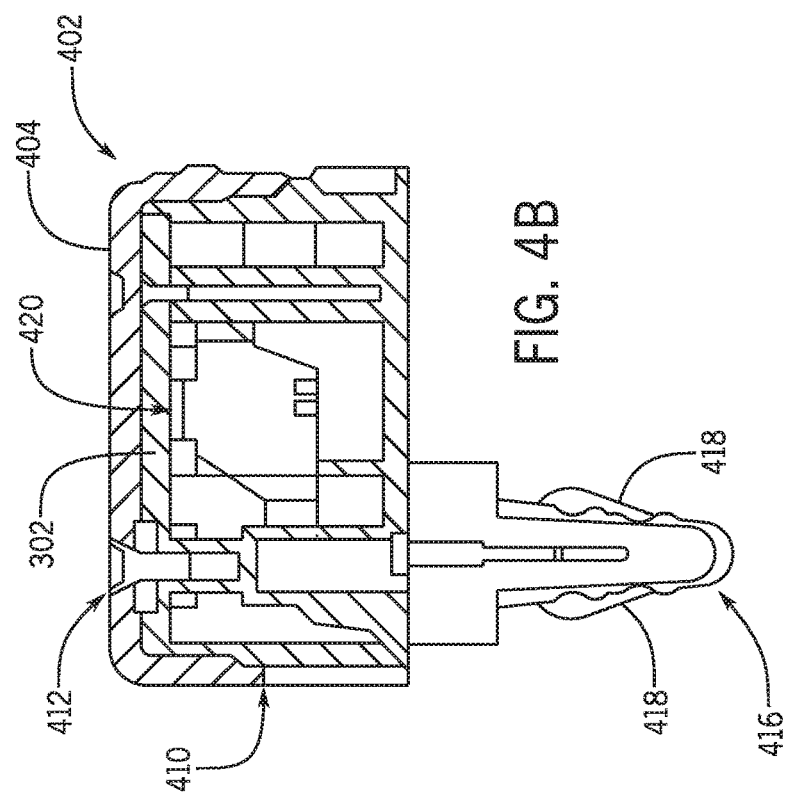
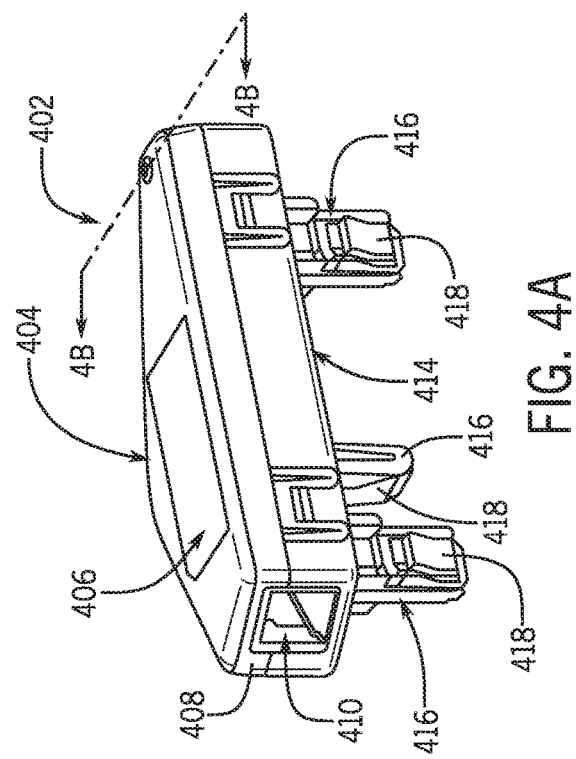
FIG. 4B
FIG. 4A

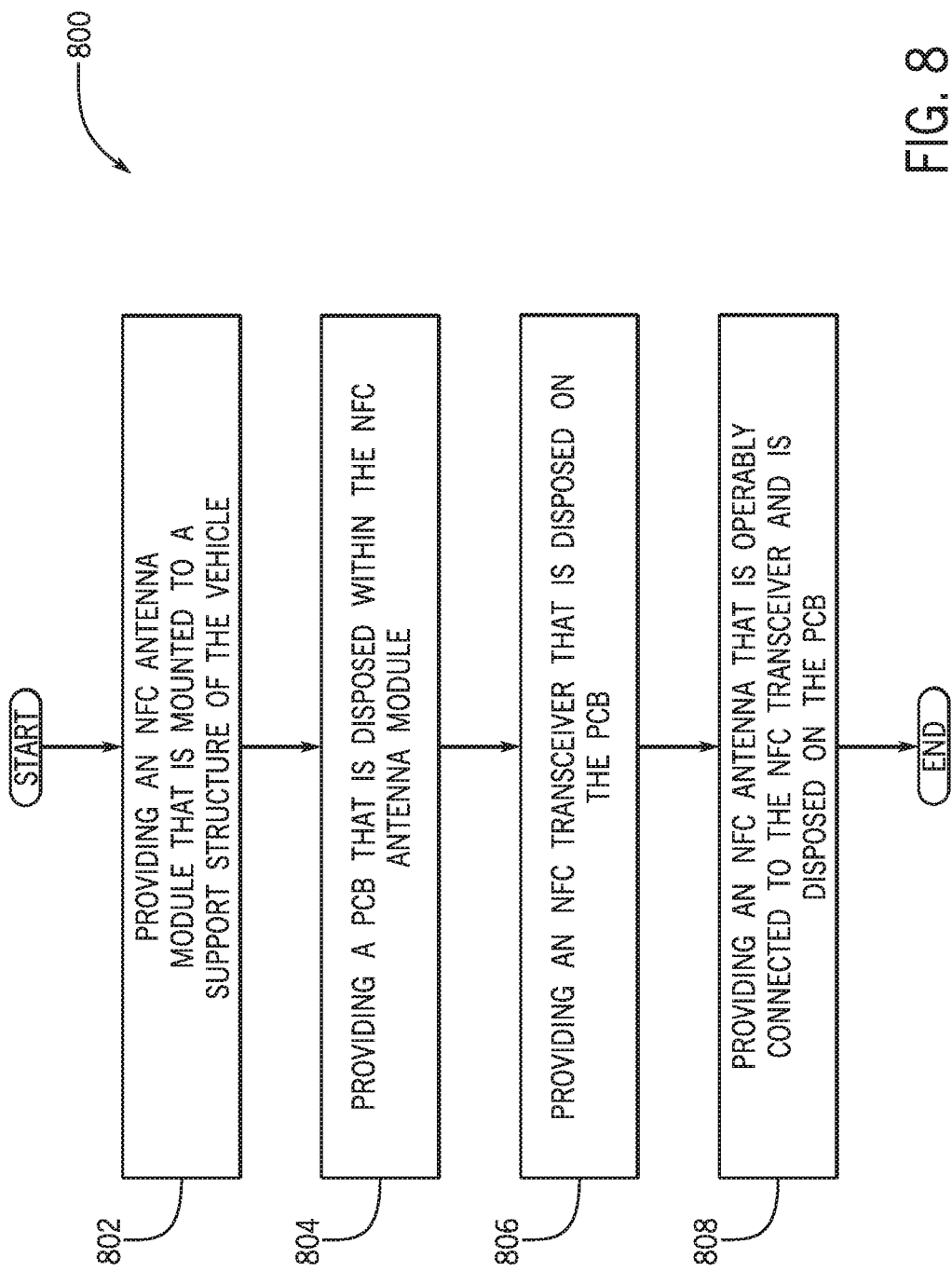

SYSTEM AND METHOD FOR PROVIDING NEAR-FIELD COMMUNICATION WITHIN A VEHICLE

BACKGROUND

Near-Field Communication (NFC) technology is being widely used to enable efficient communication of data and transactions to be completed. In many cases, portable devices, payment cards, key fobs, and other types of hardware include respective NFC tags that may be utilized to communicate via the NFC technology to provide short range secure communications of data that provide enhanced security. The NFC technology does not require a physical electrical contact to be established between the NFC tag and an NFC receiver. However, the technology does require that the NFC tag is within a close proximity to an NFC antenna to be able to transfer signals to the NFC antenna.

In many cases, NFC antennas are configured in a typical round shape (from a top plan view). This shape may provide limited surface area from which data may be successfully communicated (via NFC communication) from a portable device or a payment card that include a NFC tag or a NFC chip. Therefore, the NFC tag or NFC chip is required to be within a close proximity to a particular area in which the NFC antenna is disposed. For example, if a typical round shaped NFC antenna is disposed within a specific portion of a machine panel, a user may be required to tap a specifically small portion of the machine panel to enable NFC communication. This limitation may pose an inconvenience in circumstances in which the NFC technology is provided in a large space in which the user may find it difficult to efficiently tap the specific portion of the particular area to enable the NFC communication.

BRIEF DESCRIPTION

According to one aspect, a communication system for a vehicle that includes a near-field communication (NFC) antenna module mounted to a support structure of the vehicle. The communication system additionally includes a printed circuit board (PCB) that is disposed within the NFC antenna module. The communication system also includes a NFC transceiver that is disposed on the PCB and a NFC antenna that is operably connected to the NFC transceiver and is disposed on the PCB. A top plan view of the NFC antenna has a polygonal shape to conform to an interior portion of a covering panel of the vehicle.

According to another aspect, a system for providing near-field communication (NFC) within a vehicle that includes a NFC antenna module that is mounted to a support structure of the vehicle and is covered by a covering panel of the vehicle. The system also includes a printed circuit board (PCB) that is disposed within the NFC antenna module. The system additionally includes a NFC transceiver that is disposed on the PCB. The system further includes a NFC antenna that is operably connected to the NFC transceiver and is disposed on the PCB. At least one side of the NFC antenna is conforming in shape to at least one interior portion of the covering panel of the vehicle and at least one side of the NFC antenna is non-conforming in shape to at least one interior portion of the covering panel of the vehicle.

According to still another aspect, a near-field communication (NFC) system for a vehicle that includes a NFC antenna that is disposed upon or in proximity to at least one interior portion of a covering panel of the vehicle. The NFC antenna is configured as at least one electrically conductive trace that is configured in at least one loop. The system also includes a clearance that is included between the NFC antenna and the covering panel of the vehicle and that is governed by a clearance ratio. The clearance ratio includes a ratio of an area that includes the NFC antenna and an area surrounding the NFC antenna to the area that includes the NFC antenna, wherein the clearance ratio is 3:1 or is less than 3:1.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

FIG. 4A is a schematic isometric view of a NFC antenna module that is configured to receive the PCB and the NFC antenna disposed on the PCB according to an exemplary embodiment;

FIG. 4B is a schematic cross-sectional view of the NFC antenna module that retains the PCB according to an exemplary embodiment;

FIG. 8 is a process flow diagram of a method for providing a communication system for a vehicle according to an exemplary embodiment.

DETAILED DESCRIPTION

Figure 1:
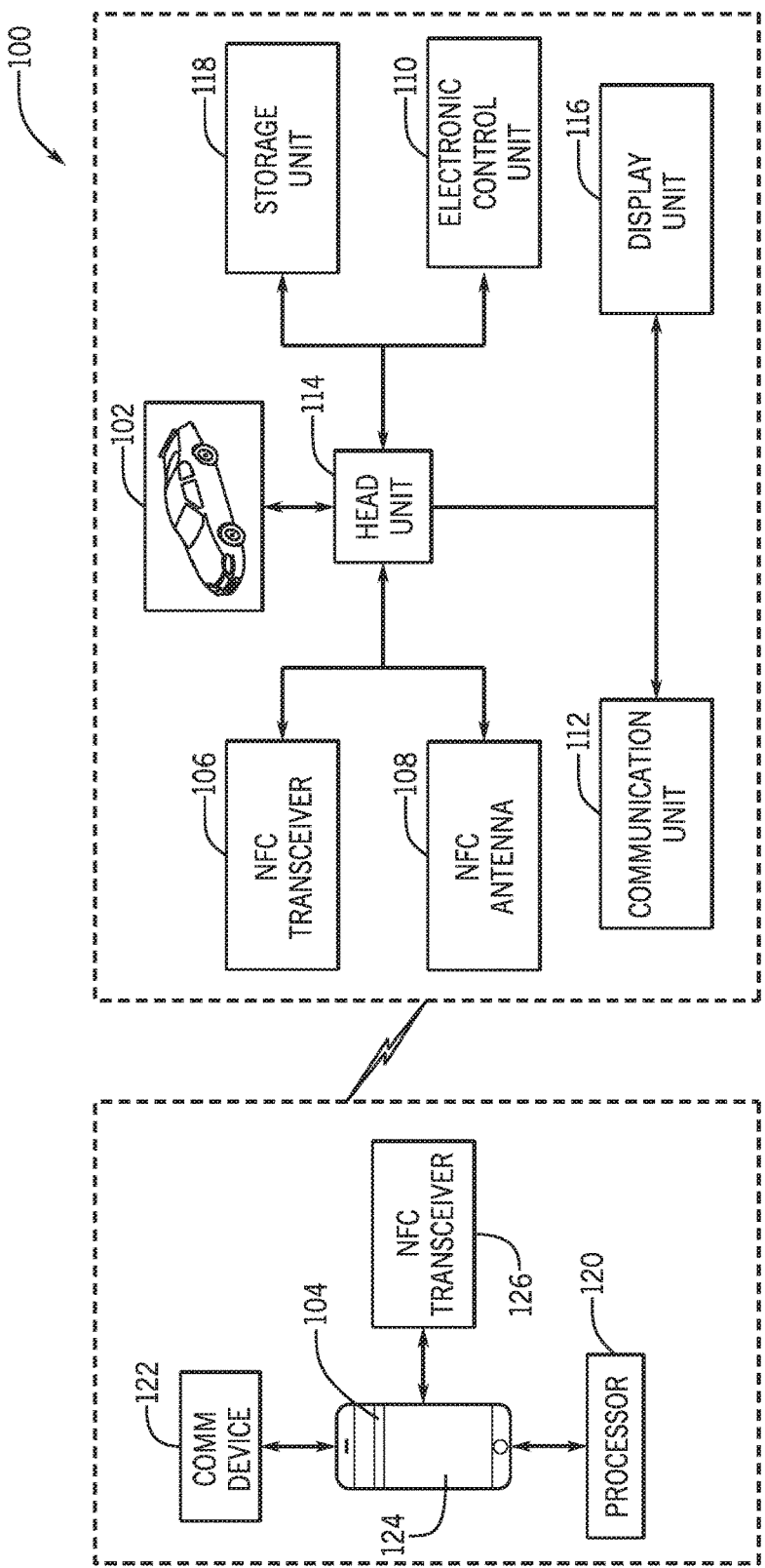
FIG. 1 is a schematic view of an operating environment of a communication system for providing near-field communication (NFC) within a vehicle, according to an exemplary embodiment.

The following includes definitions of selected terms employed herein. The definitions include various examples and/or forms of components that fall within the scope of a term and that can be used for implementation. The examples are not intended to be limiting.

A "bus", as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "database", as used herein can refer to table, a set of tables, a set of data stores and/or methods for accessing and/or manipulating those data stores. Some databases can be incorporated with a disk as defined above.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

An "operable connection", or a connection by which entities are "operably connected", is one in which signals, physical communications, and/or logical communications can be sent and/or received. An operable connection can include a wireless interface, a physical interface, a data interface and/or an electrical interface.

A "processor", as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (EV) and plug-in hybrid electric vehicles (PHEV). The term "vehicle" can also refer to an autonomous vehicle and/or self-driving vehicle powered by any form of energy. The autonomous vehicle may or may not carry one or more human occupants. Further, the term "vehicle" can include vehicles that are automated or non-automated with pre-determined paths or free-moving vehicles.

An "irregular polygonal shape" as used herein, refers to a polygon shaped component that include non-equivalent side dimensions and/or non-equivalent angles. In particular, the term "irregular polygonal shape" refers to a polygon with sides that are not all the same length and/or with interior angles that do not all have the same measure. The "irregular polygonal shape" may have sides of any length and each interior angle may be any measure. The sides such that they may be convex or concave.

I. Overview of the System

Figure 2A:
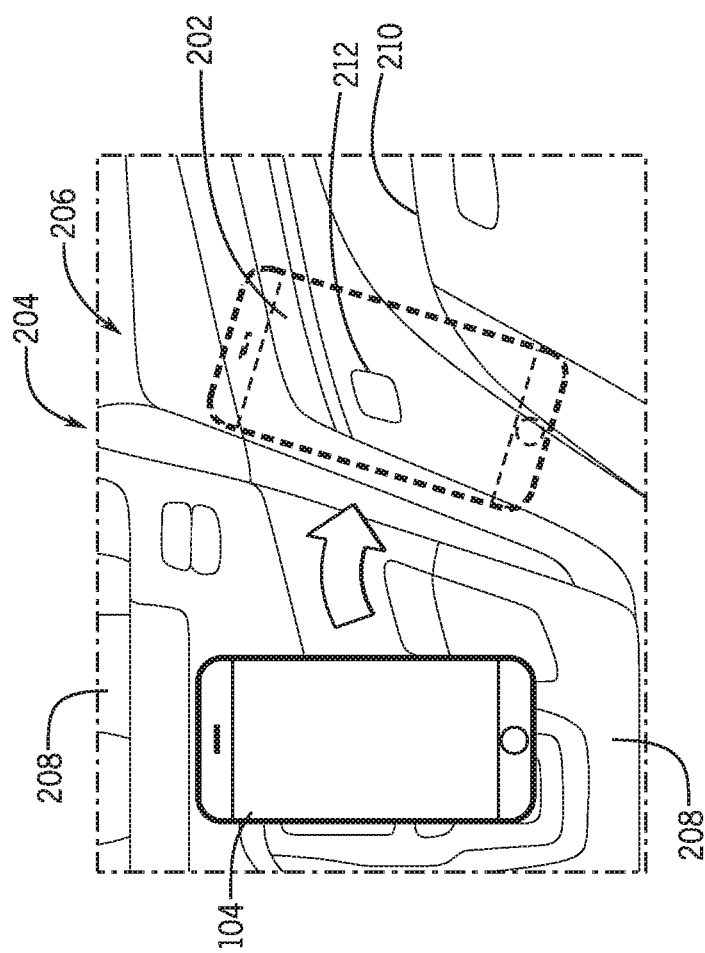
FIG. 2A is an illustrative view of an interior cabin of the vehicle which includes a covering panel of a center console of a dashboard of the vehicle, according to an exemplary embodiment.

Referring now to the drawings, FIG. 1 is directed to a schematic view of an operating environment of a communication system (system) 100 for providing near-field communication (NFC) within a vehicle 102, according to an exemplary embodiment. FIG. 2 is an illustrative view of an interior cabin of the vehicle 102 which includes a covering panel 202 of a front center console 204 (center console) of a dashboard 206 of the vehicle 102, according to an exemplary embodiment. With reference to FIG. 1 and FIG. 2A, in an exemplary embodiment, the system 100 may allow NFC signals to be commutatively exchanged between an NFC transceiver 126 that is disposed within a portable device 104 and an NFC transceiver 106 through an NFC antenna 108.

As discussed below, the NFC transceiver 106 and the NFC antenna 108 may be disposed on/behind one or more interior portions of the covering panel 202. The NFC antenna 108 may be configured in various shapes, sizes, and dimensions to conform to the one or more interior portions of the covering panel 202. In particular, the NFC antenna 108 may be configured in the various shapes, sizes, and dimensions such that one or more sides of the NFC antenna 108 may be conforming in shape to one or more interior portions of the covering panel 202 and one or more sides of the NFC antenna 108 may be non-conforming in shape to one or more interior portions of the covering panel 202. Additionally, the NFC antenna 108 may be disposed at a particular clearance between the NFC antenna 108 and the covering panel 202 that may maximize a useable area of the covering panel 202 to allow a user (not shown) to efficiently place the portable device 104 near the covering panel 202 of the center console 204 or tap the portable device 104 upon various exterior portions of the covering panel 202 of the center console 204. In particular, the clearance between the NFC antenna 108 and the covering panel 202 may be based on if the NFC antenna is disposed directly on the one or more interior portions of the covering panel 202 or if the NFC antenna 108 is attached to a NFC antenna module (not shown) without being disposed directly on the one or more interior portions of the covering panel 202.

Upon the placement of the portable device 104 near the covering panel 202 or the tapping of the portable device 104 upon the covering panel 202, the communication of NFC signals may occur between the NFC transceiver 126 of the portable device 104 and the NFC antenna 108 to be communicated to the NFC transceiver 106. The various shapes, sizes, and dimensions may also be provided to maximize a useable area of the covering panel 202 to allow efficient transfer of NFC signals to/from the portable device 104 that may be configured in a plurality of form factors, designs, and/or configurations. For instance, as discussed below, in one embodiment, a top plan view of the NFC antenna 108 (shown in FIGS. 2A, 2B, 3) may have an irregular polygonal shape that may partially conform in shape to one or more interior portions of the covering panel 202 and/or may be partially complementary in shape to one or more portions of the covering panel 202 to provide a maximized useable area of the covering panel 202 to allow efficient transfer of NFC signals between the NFC tag of the portable device 104 and the NFC antenna 108.

Upon the placement/tapping of the portable device 104, the NFC transceiver 106 may thereby determine that the NFC transceiver 126 of the portable device 104 is within a predetermined proximity of the covering panel 202 and may thereby establish NFC communication between the NFC antenna 108 and the NFC transceiver 126. Therefore, the user may be able to efficiently enable the transfer of NFC signals between the portable device 104 and the NFC transceiver 106 without having to specifically tap a particularly limited and specific portion of the portable device 104 with a particularly limited and specific portion of the covering panel 202 to enable transfer of data from the NFC transceiver 126 of the portable device 104 to the NFC transceiver 106 of the vehicle 102 via NFC communication.

In an exemplary embodiment, the vehicle 102 may include an electronic control unit 110 (ECU) that may be operably connected to (via a bus) the components of the vehicle 102 and operably controls the components of the vehicle 102, including the NFC transceiver 106. The ECU 110 of the vehicle 102 may include a processor (not shown), a memory (not shown), a disk (not shown), and an input/output (I/O) interface (not shown), which are each operably connected for computer communication via a bus (not shown). The I/O interface provides software and hardware to facilitate data input and output between the components of the ECU 110 and other components, networks, and data sources of the system 100. In one embodiment, the ECU 110 may execute one or more operating systems, applications, and/or interfaces that are associated with the vehicle 102 and/or a plurality of vehicle systems (not shown) of the vehicle 102.

The ECU 110 may execute one or more applications, operating systems, vehicle system and subsystem user interfaces, among others. The ECU 110 may also communicate one or more commands to one or more components of the vehicle 102 based on data provided by the one or more components of the vehicle 102. In one embodiment, the ECU 110 may be operably connected to a communication unit 112 of the vehicle 102. The communication unit 112 may include one or more transceivers (not shown) that are capable of providing wireless computer communications utilizing various protocols to be utilized to send/receive electronic signals internally to components and systems within the vehicle 102 and to external devices including, but not limited to, the portable device 104. The communication unit 112 may be capable of providing wired or wireless computer communications utilizing various protocols to send/receive non-transitory signals internally to the plurality of components of the vehicle 102 and/or externally to the portable device 104.

Generally, these protocols include a wireless system (e.g., IEEE 802.11 (WiFi), IEEE 802.15.1 (Bluetooth®)), a local area network (LAN), and/or a point-to-point system. More particularly, the communication unit 112 may be utilized to initiate one or more wireless connections via one or more wireless protocols based on one or more commands that are provided by the ECU 110 based on a NFC handshake that occurs between the NFC transceiver 106 and the NFC transceiver 126 of the portable device 104 via the NFC antenna 108. As discussed below, the NFC handshake may allow the portable device 104 to send a device ID associated with the portable device 104 via NFC communication between the NFC transceiver 126 of the portable device 104 and the NFC transceiver 106 of the vehicle 102.

For purposes of simplicity, this disclosure specifically describes the pairing of the portable device 104 and the vehicle 102 to initiate a Bluetooth® connection via a Bluetooth® communication protocol (IEEE 802.15.1) between the portable device 104 and the vehicle 102 based on the NFC handshake between the NFC transceiver 126 of the portable device 104 and the NFC transceiver 106 of the vehicle 102. However, it is to be appreciated that various types of wireless connections using various types of wireless communication protocols may be initiated based on the NFC handshake between the NFC transceiver 126 of the portable device 104 and the NFC transceiver 106 of the vehicle 102. For example, during the NFC handshake, the portable device 104 may send a stored network security key through NFC communication with the NFC transceiver 106 to allow a Wi-Fi connection between the portable device 104 and the vehicle 102.

In one embodiment, the ECU 110 may also be operably connected to a head unit 114 of the vehicle 102. The head unit 114 may include internal processing memory, an interface circuit, and bus lines (components of the head unit not shown) for transferring data, sending commands, and communicating with the components of the vehicle 102 directly and/or through the ECU 110. The head unit 114 may be configured to execute one or more operating systems, applications, and/or interfaces that are associated to the vehicle 102 and the plurality of vehicle systems.

In one or more embodiments, the head unit 114 may be connected to a display unit 116 that may be disposed within a center stack portion 208 of the center console 204 of the dashboard 206 of the vehicle 102. The display unit 116 may be configured as a touch-screen display that is capable of receiving touch inputs onto a screen portion (not shown) of the display unit 116. In an additional embodiment, the display unit 116 may be configured as a meter display unit that is presented near a speedometer (not shown) of the vehicle 102 and/or a head-up display (HUD) that is projected onto a windshield (not shown) and/or one or more additional windows (not shown) of the vehicle 102. In some embodiments, the display unit 116 may be operably connected to an external input device (e.g., touchpad, joystick, physical input buttons) that may be inputted by the user.

Based on the operation of the head unit 114 and/or one or more of the plurality of vehicle systems of the vehicle 102, the display unit 116 may present one or more vehicle human machine interfaces (vehicle HMI) to provide the user with various types of information and/or to receive one or more inputs from the user within the vehicle 102. More specifically, the vehicle HMI may pertain to one or more operating systems, vehicle system interfaces, and application interfaces, including interfaces pertaining to NFC communication between the NFC transceiver 126 of the portable device 104 and the NFC transceiver 106 of the vehicle 102.

In one embodiment, the vehicle HMI may present one or more user interfaces that present information to the user with respect to the Bluetooth® pairing of the portable device 104 and the vehicle 102 that may be initiated based on the NFC handshake between the NFC transceiver 126 of the portable device 104 and the NFC transceiver 106 of the vehicle 102. As an illustrative example, the display unit 116 may present a NFC manager user interface that allows a user to initiate the Bluetooth® connection between the portable device 104 and the communication unit 112 of the vehicle 102. The user interface may prompt the user to initiate tapping of the respective portable device 104 upon one or more exterior portions of the covering panel 202 of the center console 204 to enable the NFC handshake between the NFC transceiver 126 of the portable device 104 and the NFC transceiver 106 of the vehicle 102 to pair the portable device 104 to the vehicle 102 via the Bluetooth® communication protocol.

In one or more embodiments, the ECU 110 and additional components of the vehicle 102 may be operably connected to a storage unit 118 of the vehicle 102. The storage unit 118 may store one or more operating systems, applications, associated operating system data, application data, vehicle system and subsystem user interface data, and the like that are executed by the ECU 110 and/or the head unit 114. In an exemplary embodiment, the communication unit 112 may access the storage unit 118 to store a list of one or more paired/connected devices that include portable device 104 that are (previously or currently) paired/connected with the communication unit 112 of the vehicle 102.

In one configuration, upon determining the NFC handshake between the portable device 104 and the NFC transceiver 106, the portable device 104 may be paired with the communication unit 112 to initiate the Bluetooth® connection between the portable device 104 and the vehicle 102. Upon pairing of the portable device 104 with the communication unit 112, the communication unit 112 may access the list of the paired/connected device(s) on the storage unit 118 and may store the device ID (e.g., serial number, user name, device ID, media access control address) associated with the portable device 104. The communication unit 112 may thereby utilize the device ID to identify the paired portable device 104 to enable subsequent Bluetooth® connectivity between the portable device 104 and the vehicle 102.

With particular reference to the portable device 104, the portable device 104 may be, for example, a cellular phone, a smart phone, a hand-held reader, a tablet device, and/or a MP3 player. The portable device 104 may be manufactured by various manufacturers and may be configured in a plurality of form factors, designs, and/or configurations. In an exemplary embodiment, the portable device 104 may include a processor 120 that may be operably connected to (via a bus) and operably controls the components of the portable device 104, including a communication device 122 of the portable device 104.

In some configurations, the processor 120 may include a memory (not shown), a disk (not shown), and an input/output (I/O) interface (not shown), which are each operably connected for computer communication via a bus (not shown). The I/O interface provides software and hardware to facilitate data input and output between the components of the processor 120 and other components, networks, and data sources, of the system 100. In one embodiment, the processor 120 may execute one or more operating systems, applications, and/or user interfaces that are associated with one or more wireless connections that are provided by the communication device 122. For instance, the processor 120 may execute one or more user interfaces that are presented on a display screen 124 of the portable device 104 that allow the user to pair the portable device 104 to the vehicle 102.

In one embodiment, the communication device 122 of the portable device 104 may include one or more transceivers (not shown) that are capable of providing wireless computer communications utilizing various protocols to be utilized to send/receive electronic signals internally to components and systems within the vehicle 102 and to additional external devices (e.g., wearable devices). The communication device 122 may be capable of providing wired or wireless computer communications utilizing various protocols to send/receive non-transitory signals internally to the plurality of components of the portable device 104 and/or externally to the vehicle 102.

Generally, these protocols include a wireless system (e.g., IEEE 802.11 (WiFi), IEEE 802.15.1 (Bluetooth®)), a local area network (LAN), and/or a point-to-point system. More particularly, the communication device 122 may be utilized to wirelessly connect to the vehicle 102 through one or more wireless connections via one or more wireless protocols based on one or more commands that are provided by the processor 120 and/or one or more signals that are sent from the communication unit 112 of the vehicle 102. As discussed, such commands may be based on the NFC handshake that occurs between the NFC transceiver 106 of the vehicle 102 and the NFC transceiver 126 of the portable device 104. In particular, the communication device 122 may communicate with the communication unit 112 of the vehicle 102 via the Bluetooth® communication protocol upon the pairing of the portable device 104 and the vehicle 102 based on the NFC handshake that occurs between the NFC transceiver 106 and the NFC transceiver 126 via the NFC antenna 108.

In an exemplary embodiment, the NFC handshake may occur based on exchange of one or more data packets (e.g., 100 Kb data packet that includes a header and payload) through NFC communication between the NFC transceiver 106 of the vehicle 102 and the NFC transceiver 126 that is disposed within the portable device 104. In one embodiment, the NFC transceiver 126 may be configured to receive power and to send NFC signals that include the data packet(s) to be received by the NFC antenna 108 when the portable device 104 is located within the predetermined proximity of the covering panel 202 (e.g., upon being placed/held near the covering panel or tapped upon the covering panel 202). The NFC transceiver 126 may thereby communicate signals that include the data packet(s) to the NFC transceiver 106. In other words, upon the placement/tapping of the portable device 104, the NFC transceiver 106 may thereby determine that a NFC transceiver 126 of the portable device 104 is within the predetermined proximity (~4 cm) of the covering panel 202 and may thereby establish NFC communication between the NFC antenna 108 and the NFC transceiver 126.

In an alternate embodiment, the portable device 104 may include one or more NFC tags (not shown) (e.g., contactless tags which operate with ISO 14443 or ISO 15693 infrastructure) that may be configured to send or receive NFC communication signals to/from the NFC transceiver 106 of the vehicle 102. The one or more NFC tags may be included in addition to or in lieu of the NFC transceiver 126 to communicate with the vehicle 102. In an additional alternate embodiment, the vehicle 102 may include one or more NFC tags (e.g., contactless tags) that may be configured to send or receive NFC communication signals to/from the NFC transceiver 126 of the portable device 104. The one or more NFC tags may be included in addition to or in lieu of the NFC transceiver 106 to communicate with the portable device 104.

In one or more embodiments, an electrical current may be utilized to power a circuit of the NFC transceiver 126 to broadcast the NFC signals by producing a magnetic field to communicate the NFC signals (e.g., ISO 13157) to the NFC antenna 108 to be further communicated to the NFC transceiver 106. The NFC antenna 108 may be configured to receive NFC signals (e.g., at 13.56 MHz) communicated from the NFC transceiver 126 when the NFC transceiver 126 is within the predetermined proximity of the covering panel 202 and the NFC antenna 108 that is operably connected to NFC transceiver 106.

More specifically, the NFC antenna 108 may receive the NFC signals upon the user placing (e.g., holding) the portable device 104 near the external portion of the covering panel 202 or tapping (e.g., making physical contact) one or more portions of the portable device 104 (e.g., physical body of a smart phone) upon the external portion of the covering panel 202 on the center console 204 of the vehicle 102. This allows the receipt of the NFC signals by the NFC antenna 108 disposed on/behind the internal of the covering panel 202 of the center console 204 of the vehicle 102 located within the predetermined proximity of the portable device 104 during the tapping of the one or more portions of the portable device 104.

Upon receipt of the NFC signals, the NFC antenna 108 may thereby communicate respective data contained within the NFC communication to the NFC transceiver 106 to thereby decipher the signals and data packet(s). In other words, the user may place/tap the portable device 104 at one or more exterior portions of the covering panel 202 of the center console 204 to effectively allow the completion of the NFC handshake that includes the communication of the NFC signals between the NFC transceiver 126 of the portable device 104 and the NFC transceiver 106 via the NFC antenna 108.

More specifically, upon receipt of the NFC signals by the NFC antenna 108, the NFC antenna 108 may communicate respective data to the NFC transceiver 106. The NFC transceiver 106 may thereby evaluate the data by deciphering the signals and data packet(s) and may complete the NFC handshake with the portable device 104 via the NFC transceiver 126. As discussed above, in an exemplary embodiment, upon completion of the NFC handshake, the communication unit 112 may complete pairing of the portable device 104 and the vehicle 102 to initiate the Bluetooth® connection via a Bluetooth® communication protocol between the communication device 122 of the portable device 104 and the communication unit 112 of the vehicle 102. In particular, upon completion of the NFC handshake, the NFC transceiver 106 may communicate respective data pertaining to the NFC handshake to the ECU 110 of the vehicle 102. Upon receiving the data regarding the NFC handshake communicated by the NFC transceiver 106, the ECU 110 may access the storage unit 118 and may query the list of one or more paired/connected devices that include the portable device 104 that are stored on the storage unit 118.

In one embodiment, the ECU 110 may query the list to determine if the device ID of the portable device 104 was previously added to the list. If it is determined that the device ID is not present within the list, the ECU 110 may determine that the device ID was not previously added to the list, and the ECU 110 may responsively add the device ID of the portable device 104 communicated by the portable device 104 via the NFC communication. The portable device 104 may thereby communicate with the vehicle 102 via the Bluetooth® connection. The user may utilize various functions that may be provided based on Bluetooth® connection, including, but not limited to, hands-free calling and the playing of audio from the portable device 104 within the vehicle 102.

In additional embodiments, one or more additional/alternative functions may be provided by the ECU 110, the communication unit 112, the head unit 114, and/or the plurality of vehicle systems of the vehicle 102 based on the NFC handshake between the NFC transceiver 126 of the portable device 104 and the NFC transceiver 106 of the vehicle 102. In one configuration, data files (e.g., executable files, music files, wall paper image files, etc.) may be transferred from the portable device 104 to the vehicle 102 upon the completion of the NFC handshake. For example, one or more data files may be communicated via NFC communication between the portable device 104 and the NFC transceiver 106 or via wireless communication between the communication device 122 and the communication unit 112.

In other configurations, settings profiles may be communicated between the portable device 104 and the vehicle 102 to implement vehicle settings associated with the user and one or more of the plurality of vehicle systems of the vehicle 102 based on the completion of the NFC handshake. In some additional configurations, payment data may be communicated between the portable device 104 and the vehicle 102 to implement automated payments directly from the vehicle 102 to a third party. For example, payment files containing payment information (e.g., credit card information) may be communicated between the NFC transceiver 126 of the portable device 104 or a NFC chip (not shown) of a payment card (not shown) to the NFC transceiver 106 to be further utilized to pay for tolls, fuel, electrical recharging energy, services, and the like directly from the vehicle 102 to a third party.

II. Physical Structure and Placement of the NFC Antenna and Associated Components With particular reference to FIG. 2A, as discussed, the NFC antenna 108 may be located on/behind an interior of the covering panel 202. The covering panel 202 itself may be supported by a support structure (shown in FIG. 6A and FIG. 6B) of a body of the vehicle 102 that allows the covering panel 202 to be held in place as a portion of the center console 204 of the dashboard 206. The covering panel 202 and/or an exterior surface portion of the covering panel 202 facing the interior cabin of the vehicle 102 may be composed of various types of non-metallic or semi-metallic materials. These materials may be provided at one or more predetermined thicknesses that allow NFC communication signals to pass through the covering panel 202. For example, the covering panel 202 may be composed of a textured plastic or a composite material that allows the passage of NFC communication signals without any interference.

As shown, the covering panel 202 of the center console 204 is included within the dashboard 206 of the center console 204 of the vehicle 102. In one embodiment, the covering panel 202 may be disposed between the center stack portion 208 and a lateral (i.e., glovebox) portion 210 of the dashboard 206. In one or more embodiments, the center console 204 may include a column portion (i.e., the center stack portion 208) and a lateral portion (i.e., the glovebox portion 210). As shown in FIG. 2A, the external surface portion of the covering panel 202 may include an emblem 212 (e.g., labeled 'IV' or 'NFC') that may be disposed at an intersection of the column portion and the lateral portion. The emblem 212 may include a light (not shown) and may provide indication to the user that the portable device 104 may be placed near (e.g., within a communicable distance) or tapped on the covering panel 202 to enable NFC communication with the vehicle 102.

In some configurations, the NFC antenna 108 may be mounted at the intersection of the column portion and the lateral portion such that the NFC antenna 108 is located on one of the column portion, the lateral portion, or on portions of each of the column portion and the lateral portion. In some embodiments, the NFC antenna 108 may be mounted directly to the support structure of the body of the vehicle 102. In other embodiments, the NFC antenna 108 may be mounted directly to the covering panel 202.

Figure 2B:
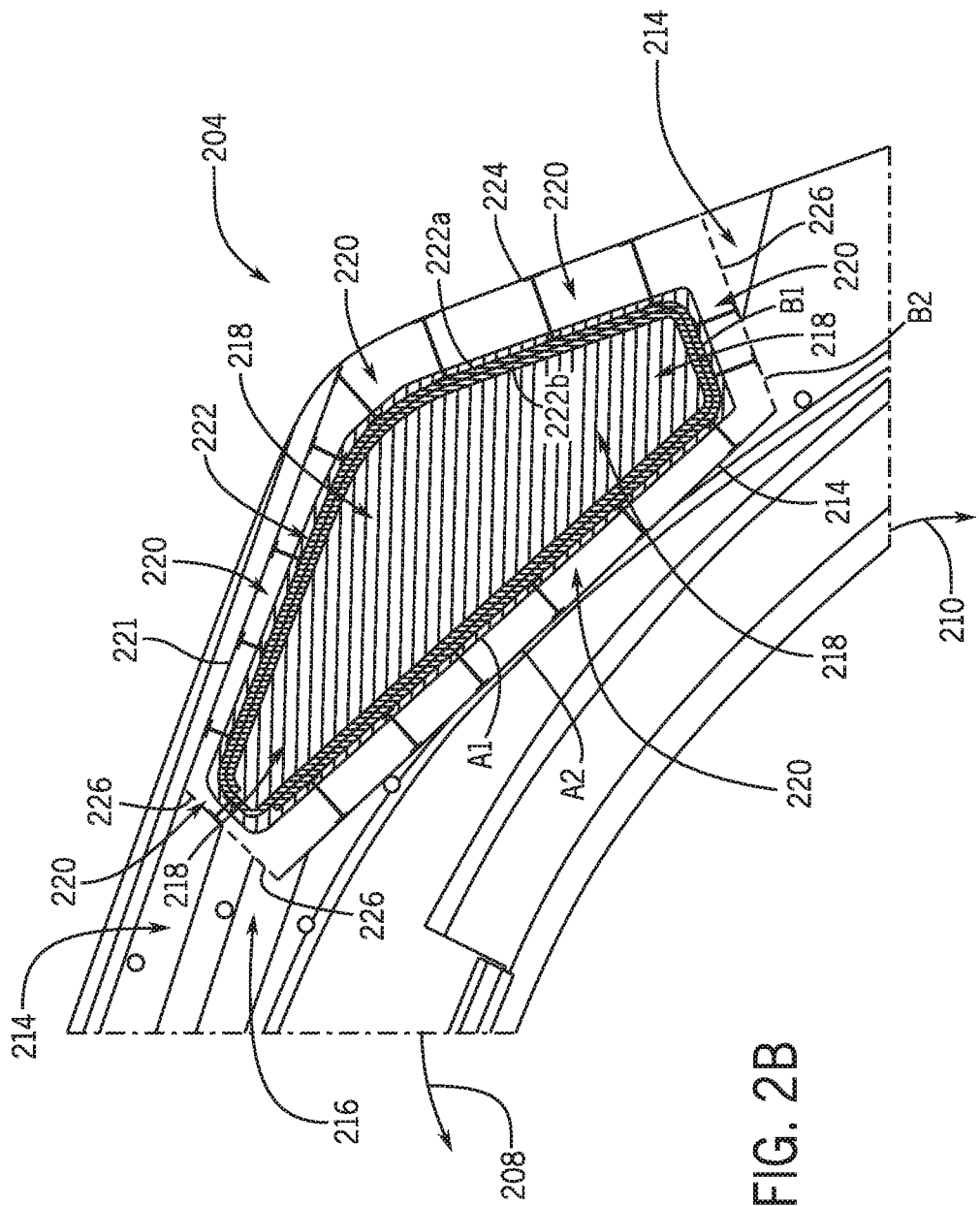
FIG. 2B is a schematic top plan view of the NFC antenna disposed upon/adjacent to one or more interior portions of the covering panel of the center console of the dashboard of the vehicle according to an exemplary embodiment.
Figure 2C:
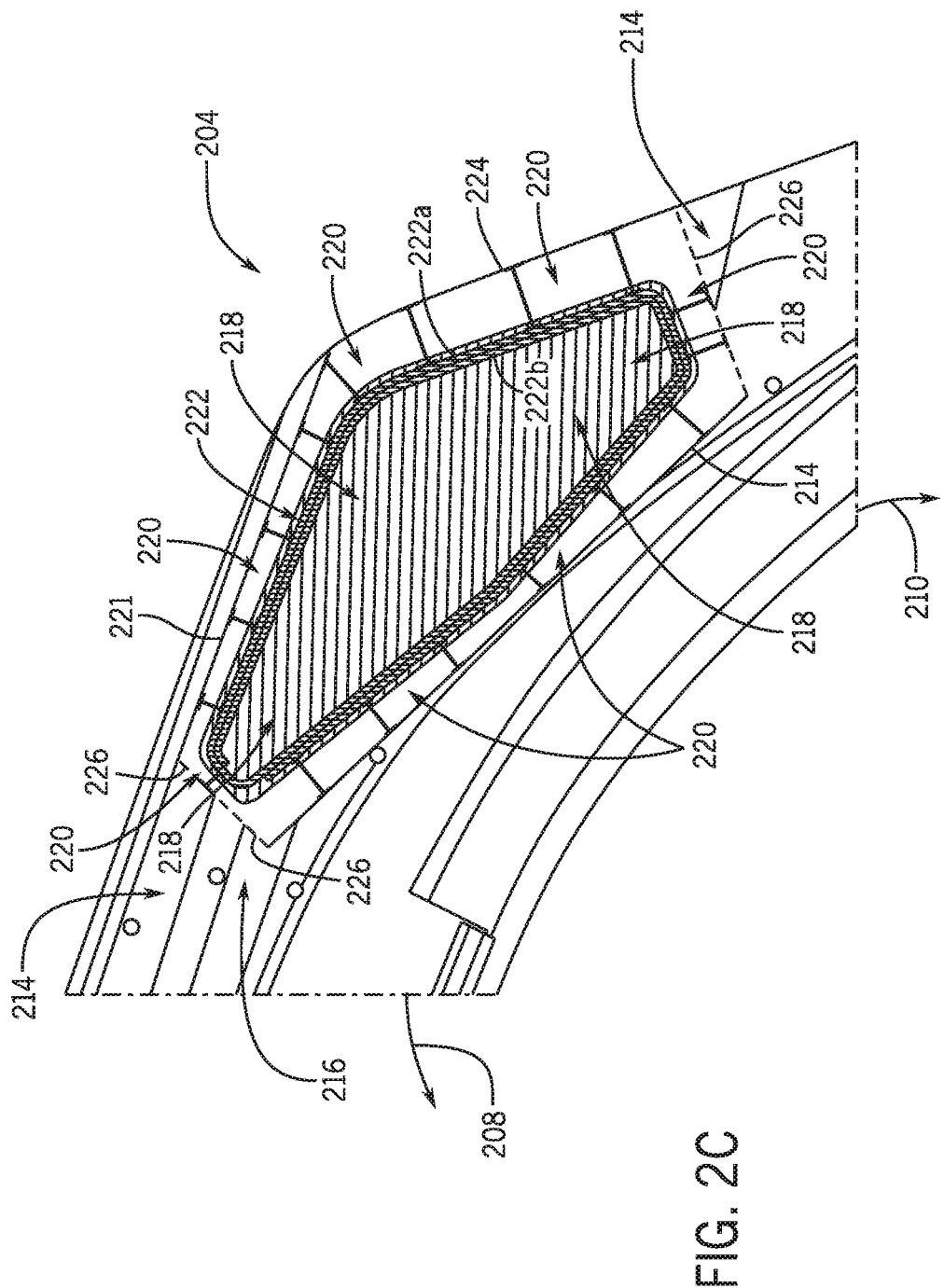
FIG. 2C is another schematic top plan view of the NFC antenna disposed upon/adjacent to one or more interior portions of the covering panel of the center console of the dashboard of the vehicle according to an exemplary embodiment.

FIG. 2B and FIG. 2C illustrate a schematic top plan view of the NFC antenna 108 disposed upon/adjacent to one or more interior portions 214 of the covering panel 202 of the center console 204 of the dashboard 206 of the vehicle 102 according to an exemplary embodiment. In one or more embodiments, the one or more of the interior portions 214 of the covering panel 202 may be configured in an irregular polygonal shape. For example, as shown in FIG. 2B, the covering panel 202 of the center console 204 may be configured in a pentagonal shape that may include one or more curved sides/portions. In one or more configurations, one or more portions of the NFC antenna 108 may be complementary in shape to one or more of the interior portions 214 of the covering panel 202. Accordingly, the NFC antenna 108 may be shaped in the irregular polygonal shape such as the pentagonal shape as shown in FIG. 2B or an alternate shape such as the hexagonal shape, as shown in FIG. 2C.

In particular, the NFC antenna 108 may be configured such that one or more sides of the NFC antenna 108 may be conforming in shape to one or more interior portions 214 of the covering panel 202 and one or more sides of the NFC antenna 108 may be non-conforming in shape to the one or more interior portions 214 of the covering panel 202. In one configuration, at least two sides of the NFC antenna 108 may be conforming in shape to at least two interior portions 214 of the covering panel 202 and at least two sides of the NFC antenna 108 may be non-conforming in shape to at least two interior portions 214 of the covering panel 202. In one configuration, as shown, one or more the interior portions 214 may include one or more walls (interior walls) that may be used to support one or more portions of the covering panel 202 of the center console 204.

In one or more embodiments, the NFC antenna 108 may include antenna traces 222 that may be configured as one or more wired loops of electrically conductive material that are configured to transmit and/or receive NFC signals when current flow is induced through the loop(s). The antenna traces 222 of the NFC antenna 108 may be disposed at one or more distances from one or more of the interior portions 214 of the covering panel 202. Accordingly, the NFC antenna 108 may be disposed such that there is a particular clearance between the NFC antenna 108 and the covering panel 202. In particular, the clearance between the NFC antenna 108 and the covering panel 202 may be based on if the NFC antenna is disposed directly (e.g., adhered) on a respective surface 216 of the one or more interior portions 214 of the covering panel 202 or if the NFC antenna 108 is independently retained by a NFC antenna module (shown in FIGS. 4A, 4B, 6A, 6B) in proximity to the surface 216 (without being disposed directly on the surface 216) of the one or more interior portions of the covering panel 202. Accordingly, the clearance between the NFC antenna 108 and the covering panel 202 may be based on mounting and placement of the NFC antenna 108 with respect to the one or more interior portions 214 of the covering panel 202 of the vehicle 102.

In an exemplary embodiment, the mounting and placement of the NFC antenna 108 may be governed according to a clearance ratio. With reference to FIG. 2B and FIG. 2C, the clearance ratio may include a ratio of an area 218 that includes the NFC antenna 108 and the area 220 surrounding the (exterior edge of the) antenna traces 222 of the NFC antenna 108 to the area 218 including the NFC antenna 108. The ratio may be utilized to govern the clearance (e.g., distance measurement) between the NFC antenna 108 and the covering panel 202.

In one embodiment, the area 218 may include a total area that is enclosed by portions of an internal edge 222b of an interior loop of the antenna traces 222. In other words, the area 218 may include a total space that is contained between the antenna traces 222 of the NFC antenna 108. In one or more embodiments, the area 220 surrounding the NFC antenna 108 may include a total area between one or more portions of an external edge 222a of an exterior loop of the antenna traces 222 (e.g., edge facing the area 220) and one or more of the walls 224 of the one or more interior portions 214 of the covering panel 202 that are adjacent to and are located at a shortest distance from the respective portions of the external edge 222a. The area 220 surrounding the NFC antenna 108 may additionally include a total area between one or more portions of the external edge 222a of the antenna traces 222 and one or more unwalled portions 226 (depicted by the dashed lines 226 in FIGS. 2B and 2C) of the one or more interior portions 214 of the covering panel 202.

The one or more unwalled portions 226 may be located at a distance from the one or more respective portions of the external edge 222a that match a shortest distance between the one or more walls 224 and the one or more portions of the external edge 222a of the antenna traces 222. For example, as depicted in FIG. 2B, the unwalled portions labeled as B2 may be located at a distance from the respective portion of the external edge 222a labeled as B1 that matches a distance from the wall labeled as A2 and the portion of the external edge 222a labeled as A1. Therefore, the distance between A1 and A2 matches the distance between B1 and B2.

As an illustrative example, the area 220 may include a distance from one or more portions of the external edge 222a of the antenna traces 222 extending to one or more of the walls 224 that are adjacent and located in closest proximity to the respective portions of the external edge 222a of the antenna traces 222. Additionally, the area 220 may include a distance from one or more alternate portions of the external edge 222a to one or more adjacent unwalled portions 226 of the covering panel 202 that matches (in distance) to the distance from the external edge 222a of the antenna traces 222 to the one or more of the walls 224 that are located in closest proximity.

In an exemplary embodiment, the clearance ratio pertaining to the ratio of the area 218 that includes the NFC antenna 108 and the area 220 surrounding the NFC antenna 108 to the area 218 including the NFC antenna 108 may be included as a 3:1 ratio or may be less than the 3:1 ratio. In particular, the clearance ratio may be included as the 3:1 ratio, a 2:1 ratio, or a 1.5:1 ratio with respect to the area 218 that includes the NFC antenna 108 and the area 220 surrounding the NFC antenna 108 to the area 220. Consequently, in one embodiment, the mounting and placement of the NFC antenna 108 may be governed according to the 3:1 clearance ratio. In another embodiment, the mounting and placement of the NFC antenna 108 may be governed according to the 2:1 clearance ratio. In yet an additional embodiment, the mounting and placement of the NFC antenna 108 may be governed according to the 1.5:1 ratio.

In some configurations, the NFC antenna 108 may be positioned at one or more angles to be complementary of one or more sloping angles of the one or more interior portions 214 of the covering panel 202 to selectively couple and communicate with the NFC transceiver 126 when the portable device 104 including the NFC transceiver 126 is within the predetermined proximity of the covering panel 202. In other words, the NFC antenna 108 may be disposed such that NFC communication may be efficiently established between the NFC antenna 108 and the NFC transceiver 126 of the portable device 104 based on placement near or tapping of the portable device 104 upon various exterior surface portions of the covering panel 202 of the center console 204.

In one or more configurations, the layout of the antenna traces 222 may be configured in various shapes, sizes, and dimensions to maximize a useable area of the covering panel 202 to optimize the size of the NFC antenna 108, a number of turns of the loops of the antenna traces 222, the physical dimensions of the of the covering panel 202 of the center console 204, the physical dimensions of a printed circuit board (PCB) on which the NFC antenna 108 may be disposed (discussed in more detail below) and the physical dimensions of a NFC antenna module (discussed in more detail below) that may receive the NFC antenna 108.

In one configuration, the antenna traces 308 may be spaced and looped to optimize the size of the NFC antenna 108 in the polygonal shape that includes one or more sides of the antenna traces 308 conforming in shape to one or more interior portions of the covering panel 202 and one or more sides of the antenna traces 308 non-conforming in shape to the one or more interior portions of the covering panel 202. It is contemplated that the top plan view of the NFC antenna 108 may be configured in various shapes, sizes, and dimensions. For example, the top plan view of the NFC antenna 108 may be shaped as a square, a rectangle, a trapezoid, a rhombus, a parallelogram, etc.

With reference again to FIG. 2A, the placement of the NFC antenna 108 with respect to the covering panel 202 may effectively allow communication of NFC signals between the NFC transceiver 126 of the portable device 104 and the NFC antenna 108 to be communicated to the NFC transceiver 106 based on the placement near or tapping of the portable device 104 on a large area of the exterior surface of the covering panel 202 of the center console 204 of the vehicle 102. The large area of the exterior surface of the covering panel 202 may include the emblem 212 but is not limited to the emblem 212. Therefore, the user may place the portable device 104 near or tap the portable device 104 upon various areas of the external surface portion of the covering panel 202 on the emblem 212 or at various portions of the external surface portion of the covering panel 202 that may not include the emblem 212 to complete the NFC handshake between the NFC transceiver 126 of the portable device 104 and the NFC transceiver 106 via the NFC antenna 108 disposed on/behind an interior of the covering panel 202.

Figure 3:
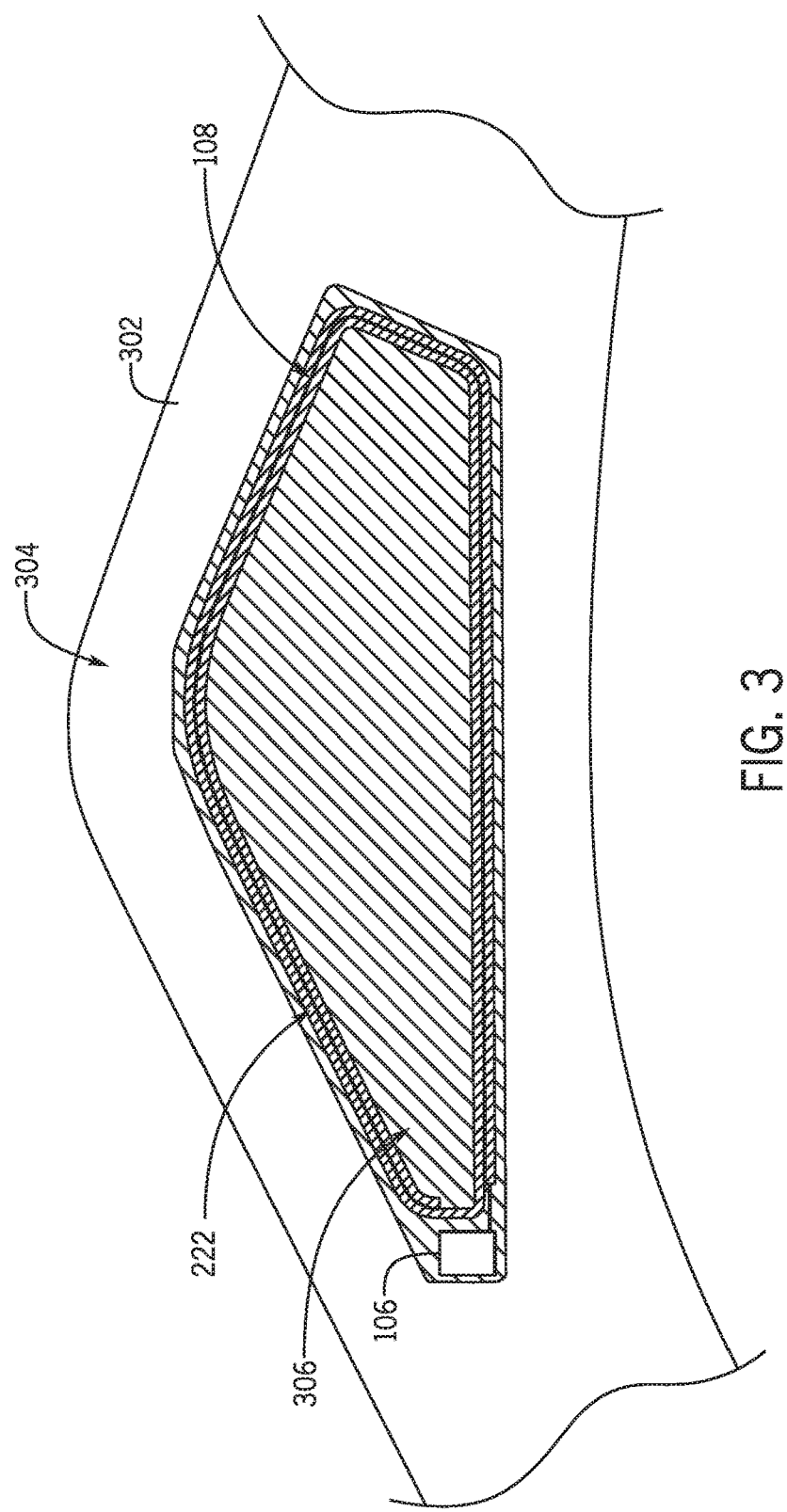
FIG. 3 is a schematic top plan view of a NFC antenna disposed upon a printed circuit board (PCB) according to an exemplary embodiment.

FIG. 3 illustrates a schematic top plan view of the NFC antenna 108 disposed upon the PCB 302 according to an exemplary embodiment. In particular, the NFC transceiver 106 and the NFC antenna 108 may be disposed on a substrate of the PCB 302. In one or more embodiments, the PCB 302 may be configured in various shapes, sizes, and dimensions such that one or more sides of the PCB 302 may be conforming in shape to one or more interior portions 214 of the covering panel 202 and one or more sides of the PCB 302 may be non-conforming in shape to the one or more interior portions 214 of the covering panel 202. In some configurations, a top plan view of the PCB 302 may have a polygonal shape to conform to one or more interior portions of the covering panel 202 and/or may be complementary in shape to one or more of the interior portions of the covering panel 202.

In one or more embodiments, the PCB 302 may be directly disposed upon one or more interior portions 214 of the covering panel 202 of the vehicle 102. In an additional embodiment, the PCB 302 may not be disposed directly to the one or more interior portions 214 and may be retained by the NFC antenna module to be in a close proximity of the one or more interior portions 214 of the covering panel 202. As illustrated in FIG. 3, the top plan view of the PCB 302 may have an irregular polygonal shape such as a pentagonal shape. The shape of the PCB 302 may conform to one or more portions of the covering panel 202 of the center console 204 of the vehicle 102. However, it is contemplated that the top plan view of the PCB 302 may have various shapes that allow the PCB 302 to hold/mount the NFC antenna 108 that may be configured in various shapes, sizes, and dimensions. For example, the top plan view of the PCB 302 may be shaped as a square, a rectangle, a trapezoid, a rhombus, a parallelogram, etc.

In one or more configurations, the PCB 302 may include an allowable space 304 on which the NFC antenna 108 may be disposed. The allowable space 304 may be provided in various sizes that may be based on the shape, size, and dimensions of the PCB 302 itself and/or the NFC antenna 108 disposed upon the PCB 302. In some configurations, the allowable space 304 may include one or more contact pads (not shown) that are disposed upon the substrate of the PCB 302. The one or more contact pads may be defined with a size and shape matching the size and shape of the NFC antenna 108.

The PCB 302 may additionally include one or more areas that include electronic circuitry including but not limited to the NFC transceiver 106 that is operably connected to the NFC antenna 108. In one or more configurations, the PCB 302 may include one or more openings that allow a portion of the Universal Serial Bus connector (USB connector) to be operably connected to the NFC transceiver 106 disposed upon the substrate of the PCB 302. As discussed below, the USB connector may be operably connected to a USB adapter that allows a USB connection (e.g., USB cord) to be operably connected to the ECU 110 and/or the head unit 114 of the vehicle 102 to allow USB communication to communicate data between the NFC transceiver 106 and the ECU 110 and/or the head unit 114. In one embodiment, the PCB 302 may additionally include a PCB area 306 that may include a non-metallic portion of the substrate of the PCB 302 that is surrounded by the NFC antenna 108. The PCB area 306 may be configured to be free of any metallic components to ensure that there is no interference with respect to the NFC communication between the NFC antenna 108 and one or more external devices including the NFC transceiver 126 of the portable device 104.

In one configuration the antenna traces 222 may be disposed directly on the substrate of the PCB 302 within the allowable space 304 of the PCB 302. For example, the antenna traces 222 may be laminated directly upon the substrate within the allowable space 304 of the PCB 302. In an additional configuration, the antenna traces 222 may be disposed upon the one or more contact pads (that are disposed upon the substrate within the allowable space 304 of the PCB 302). The one or more contact pads may provide an insulating surface between the substrate and the antenna traces 308 of the NFC antenna 108. As discussed, the NFC antenna 108 may be configured in the various shapes, sizes, and dimensions such that one or more sides of the antenna traces 222 of the NFC antenna 108 may be conforming in shape to one or more interior portions of the covering panel 202 and one or more sides of the antenna traces 222 of the NFC antenna 108 may be non-conforming in shape to the one or more interior portions of the covering panel 202.

FIG. 4A illustrates a schematic isometric view of the NFC antenna module 402 that is configured to receive the PCB 302 and the NFC antenna 108 disposed on the PCB 302 according to an exemplary embodiment. In an exemplary embodiment, the NFC antenna module 402 may be included as a multi-sided enclosure/casing that is configured to be disposed upon the support structure (shown in FIGS. 6A and 6B) of the body of the vehicle 102.

FIG. 4B illustrates a schematic cross-sectional view of the NFC antenna module 402 that retains the PCB 302 according to an exemplary embodiment. In one or more embodiments, the alignment of the PCB 302 within the NFC antenna module 402 may allow the NFC antenna 108 to be disposed at a particular clearance with respect to the covering panel 202 of the center console of the vehicle 102. For instance, the alignment (e.g., angle) of the PCB 302 disposed upon the inner surface 420 of a panel facing portion 404 of the NFC antenna module 402 may allow the NFC antenna 108 to be disposed at a particular clearance with respect to the covering panel 202 of the vehicle 102.

With continued reference to FIG. 4A and FIG. 4B, the NFC antenna module 402 may be configured in various shapes, sizes, and dimensions to conform to one or more interior portions of the covering panel 202 of the center console 204 of the vehicle 102. In one embodiment, a top plan view of the NFC antenna module 402 may be conforming in shape to one or more of the interior portions 214 of the covering panel 202 and may be non-conforming in shape to one or more of the interior portions 214 of the covering panel 202. As shown, the top plan view may have a polygonal shape (e.g., an irregular polygonal shape) to conform to one or more of the interior portions 214 of the covering panel 202. It is contemplated that the top plan view of the NFC antenna module 402 may have various shapes that allow reception of the PCB 302 and the NFC antenna 108 that may each be configured in various shapes, sizes, and dimensions. For example, the top plan view of the NFC antenna module 402 may be shaped as a square, a rectangle, a trapezoid, a rhombus, a parallelogram, etc.

In one embodiment, the NFC antenna module 402 as a whole, the panel facing portion 404 of the NFC antenna module 402, and/or a partial portion 406 of the panel facing portion 404 of the NFC antenna module 402 may be composed of various types of non-metallic materials. These materials may be provided at one or more predetermined thicknesses that allow NFC communication signals to pass through the enclosure/casing structure of the NFC antenna module 402. For example, the panel facing portion 404 of the NFC antenna module 402 may be composed of a plastic/composite material that allows the passage of NFC communication signals without any interference between the NFC antenna 108 and the NFC transceiver 126 of the portable device 104.

In an exemplary embodiment, a first side wall portion 408 of the NFC antenna module 402 may include an opening 410 that is configured to accept the USB connection that may also be connected to the ECU 110 and/or the head unit 114 of the vehicle 102. In one configuration, upon being fed into the NFC antenna module 402, the USB connection may be operably connected to a USB adapter 412 that includes a USB connector (not shown) that connects to the NFC transceiver 106 disposed upon the substrate of the PCB 302.

In particular, the USB connector may pass from the opening(s) of the PCB 302 to the USB adapter 412 to connect to the USB connection that passes through the opening 410 of the first side wall portion 408 of the NFC antenna module 402 to be operably connected to the ECU 110 and/or the head unit 114 of the vehicle 102. This connection may allow the communication of data between the NFC transceiver 106 disposed upon the PCB 302 within the NFC antenna module 402 and the ECU 110 and/or the head unit 114. Such communication may include the communication of data that pertains to the NFC handshake between the NFC transceiver 106 and the NFC transceiver 126 of the portable device 104 to enable the connection of the portable device 104 to the vehicle 102 to wirelessly communicate with the vehicle 102 via a wireless communication protocol.

In some embodiments, a support facing portion 414 of the NFC antenna module 402 may include one or more fasteners (e.g., snap clips) 416. As discussed below, the one or more snap clips 416 may be configured to snap into place into one or more respective apertures (shown in FIG. 6A and FIG. 6B) of the support structure of the body of the vehicle 102 to mount the NFC antenna module 402 directly to the support structure. The one or more snap clips 416 may each include flanges 418 of the two sides of each of the one or more snap clips 416. In one configuration, the flanges 418 may be compressed to allow the one or more snap clips 416 to have a smaller diameter than the respective apertures to allow the snap clip(s) 416 to pass through the aperture(s) without resistance. Upon insertion of the snap clip(s) 416, the flanges 418 may be configured to provide a springing mechanism to expand and make contact with side walls within the respective apertures of the support structure to retain and hold the NFC antenna module 402 in place to be mounted upon the support structure of the body of the vehicle 102.

Figure 5:
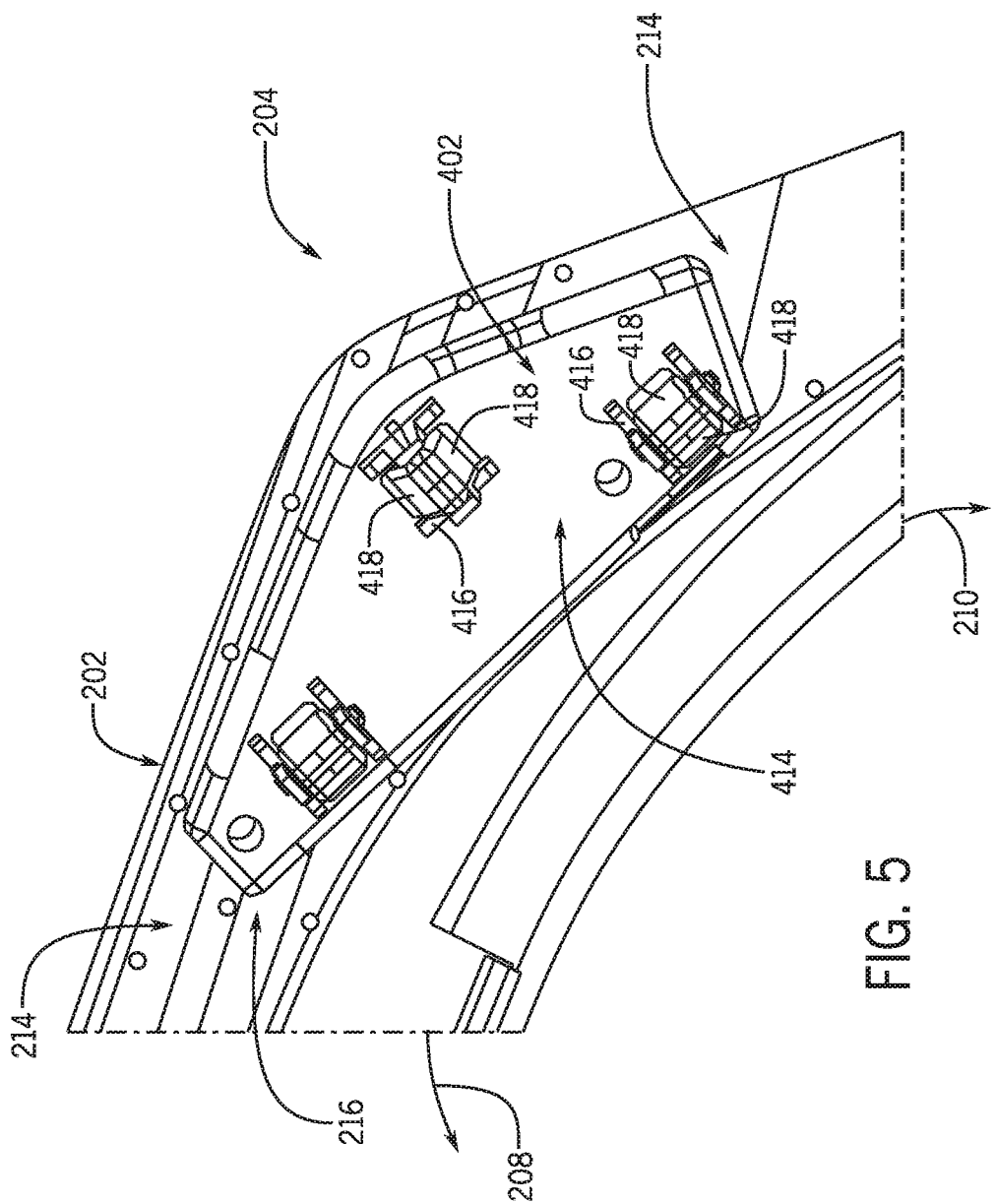
FIG. 5 is a schematic bottom plan view of the NFC antenna module disposed upon/adjacent to one or more interior portions of the covering panel of the center console of the dashboard of the vehicle according to an exemplary embodiment.

FIG. 5 illustrates a schematic bottom plan view of the NFC antenna module 402 disposed upon/adjacent to one or more interior portions 502 of the covering panel 202 of the center console 204 of the dashboard 206 of the vehicle 102 according to an exemplary embodiment. As illustrated, the NFC antenna module 402 may have an irregular polygonal shape that may conform to one or more of the interior portions 214 of the covering panel 202 of the center console 204 of the vehicle 102. The NFC antenna module 402 may be configured to hold the PCB 302 and the NFC antenna 108 upon/adjacent to one or more of the interior portions 214 of the covering panel 202 of the center console 204 to allow for one or more clearances between the NFC antenna 108 and the covering panel 202.

In one or more embodiments, the NFC antenna module 402 may be mounted to be located at the intersection of the column portion and the lateral portion of the center console 204 between the center stack portion 208 and the glovebox portion 210 of the dashboard 206. In one configuration the NFC antenna 108 may be located on one of the column portion, the lateral portion, or on portions of each of the column portion and the lateral portion.

In an exemplary embodiment, the NFC antenna module 402 may be mounted to be disposed at one or more distances from the covering panel 202 to provide one or more clearances between the NFC antenna 108 and the covering panel 202. In one or more configurations of the system may allow the mounting and placement of the NFC antenna 108 as governed by the clearance ratio pertaining to the ratio of the area 218 that includes the NFC antenna 108 and the area 220 surrounding the NFC antenna 108 to the area 218 that includes the NFC antenna 108.

In one embodiment, an entirety of the panel facing portion 404 or one or more portions (e.g., the partial portion 406) of the panel facing portion 404 of the NFC antenna module 402 may be adhered to the surface 216 of one or more of the interior portions 214. Accordingly, in some configurations, the clearance between the NFC antenna 108 and the covering panel 202 may be based on the arrangement of the adherence of one or more portions of the panel facing portion 404 of the NFC antenna module 402 to the surface 216. In additional embodiment, the NFC antenna module 402 may be mounted upon the support structure without any contact with the one or more interior portions 214 of the covering panel 202 to dispose the NFC antenna 108. The NFC antenna module 402 may thereby be mounted such that the clearance between the NFC antenna 108 and the covering panel 202 may be governed by the clearance ratio.

Figure 6A:
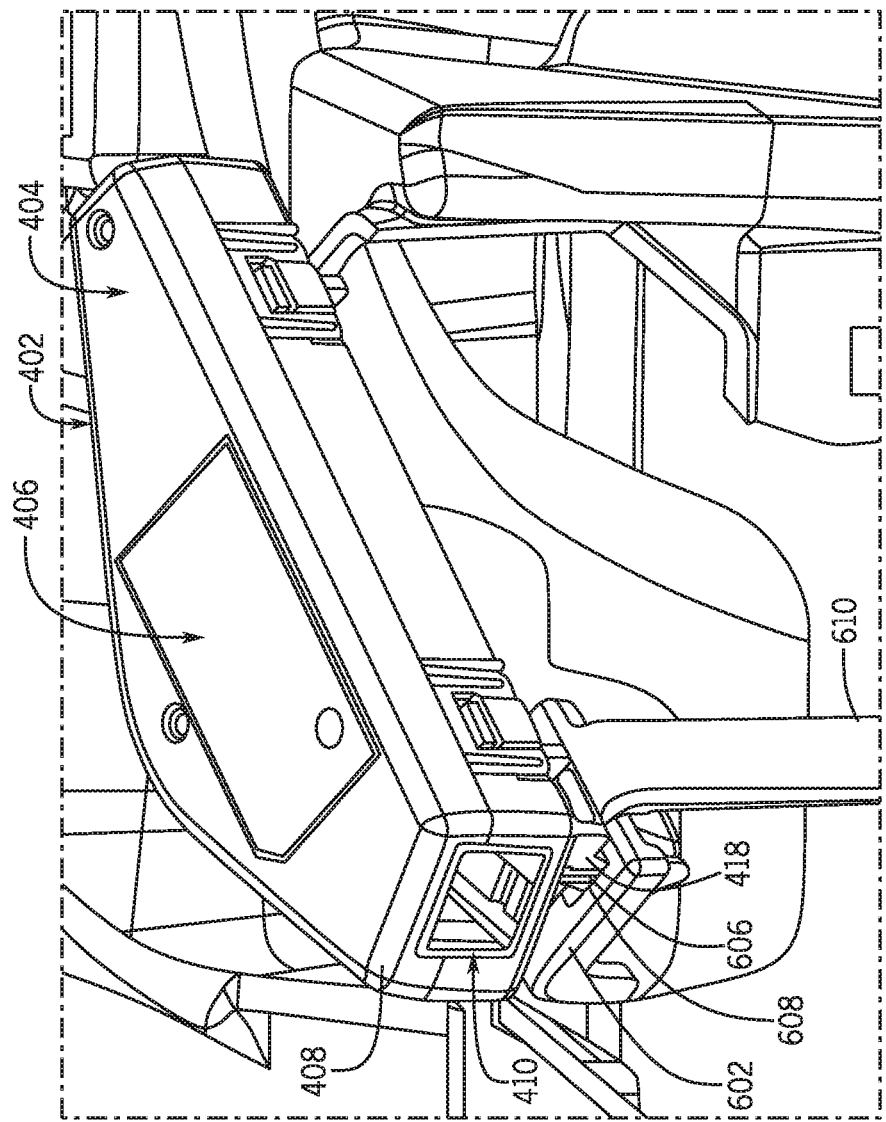
FIG. 6A is a schematic perspective view of the NFC antenna module mounted on a platform of a support structure of a body of the vehicle according to an exemplary embodiment.
Figure 6B:
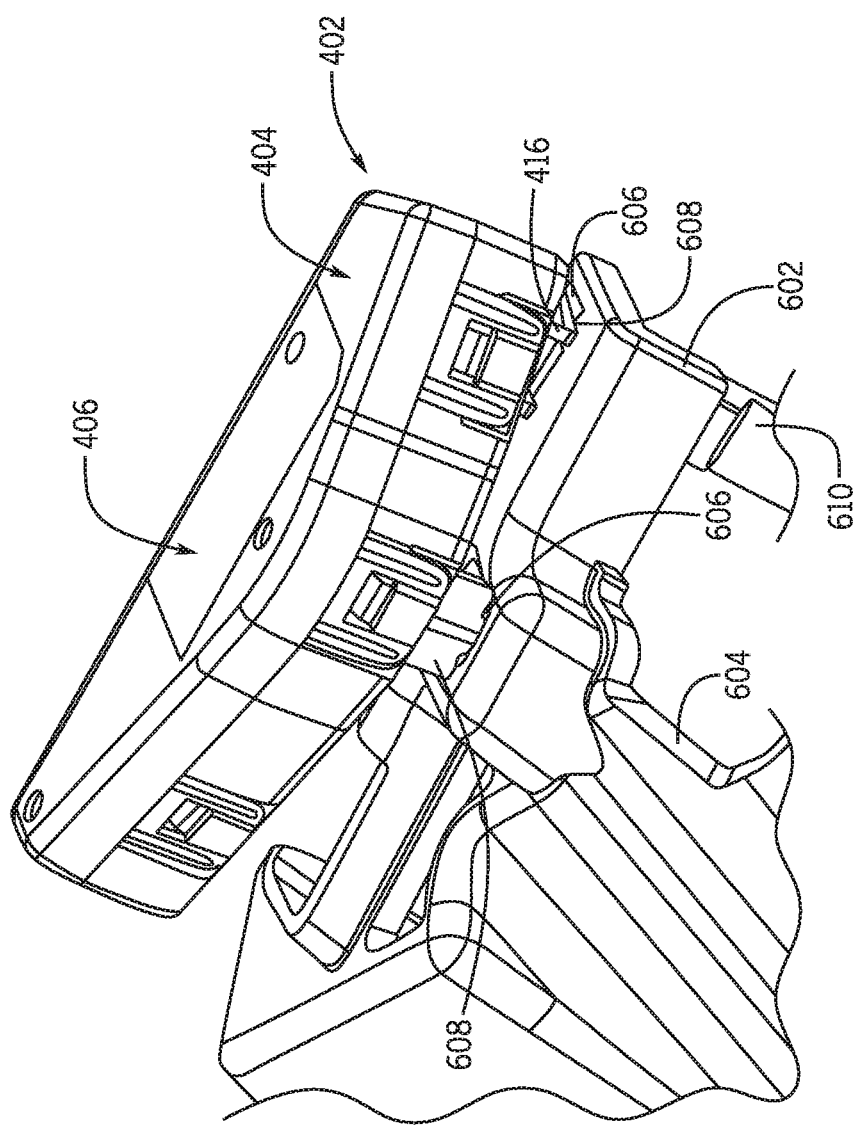
FIG. 6B is another schematic perspective view of the NFC antenna module mounted on the platform of the support structure of the body of the vehicle according to an exemplary embodiment.

FIG. 6A and FIG. 6B are schematic perspective views of the NFC antenna module 402 mounted on a platform 602 of the support structure 604 of the body 608 of the vehicle 102 according to an exemplary embodiment. In an exemplary embodiment, the support structure 604 is disposed behind one or more of the interior portions 502 of the covering panel 202 of the center console 204 of the dashboard 206 of the vehicle 102. The support structure 604 and the covering panel 202 may be part of the center console 204 of the vehicle 102 and may thereby provide support to (e.g., support the weight of) one or more components of the vehicle 102 that are disposed on and/or within the center console 204 of the dashboard 206, the covering panel 202, and/or additional panels, lighting, and components of the dashboard 206 of the vehicle 102.

In one or more embodiments, the support structure 604 may also be configured to mount the NFC antenna module 402 such that the NFC antenna module 402 is mounted at the intersection of the column portion and the lateral portion of the center console 204 of the vehicle 102. Additionally, the support structure 604 may be configured to mount the NFC antenna module 402 such that the panel facing portion 404 of the NFC antenna module 402 is disposed within a particular clearance of the covering panel 202 of the center console 204 as governed by the clearance ratio.

As discussed, the support structure 604 may include one or more apertures 606 that are configured to accept the one or more snap clips 416 disposed upon the support facing portion 414 of the NFC antenna module 402. The one or more apertures 606 may include side walls (not shown) within the aperture(s) 606 that are configured to retain and hold the NFC antenna module 402 in place to be mounted upon the support structure 604. In one embodiment, the one or more apertures 606 are sized to include a smaller diameter than the largest diameter of the respective snap clips 416 of the NFC antenna module 402.

In one configuration, during insertion of the snap clip(s) 416 into the aperture(s) 606, the flanges 418 of the snap clip(s) 416 may be compressed to fill the diameter of the aperture(s) 606. Upon insertion of the snap clip(s) 416 within the aperture(s) 606, the flanges 418 of the snap clip(s) 416 may expand to make contact with the side walls within the aperture(s) 606. In other words, the flanges 418 may spring back to their maximum span to secure the NFC antenna module 402 to the support structure 604. The NFC antenna module 402 may thereby become retained and fixedly secured into place to be mounted upon the platform 602 of the support structure 604 of the body 608 of the vehicle 102.

In an exemplary embodiment, the support structure 604 may be included as a stilted structure that includes one or more stilted portions 610. The stilted portion(s) 610 may be configured to collapse, crush, and/or crumple at a controlled rate if a predetermined amount of force is applied onto the center console 204 of the dashboard 206 of the vehicle 102. Consequently, one or more portions of the platform 602 and/or the entirety of the support structure 604 on which the NFC antenna module 402 is mounted may be configured to collapse, crush, and/or crumple at a controlled rate if the predetermined amount of force is applied onto the center console 204 of the dashboard 206. It is to be appreciated that the support structure 604 and/or the one or more stilted portions 610 of the support structure 604 may be configured in various shapes, sizes, and dimensions to mount the NFC antenna module 402 and provide support to one or more components of the vehicle 102 that are disposed on and/or within the center console 204 of the dashboard 206, the covering panel 202, and/or additional panels, lighting, and components of the dashboard 206 of the vehicle 102.

In an exemplary embodiment, the NFC antenna module 402 is mounted upon the platform 602 of the support structure 604 such that the panel facing portion 404 of the NFC antenna module 402 is facing one or more of the interior portions 214 of the covering panel 202. Consequently, as the user places the portable device 104 near or taps the portable device 104 upon various exterior portions of the covering panel 202 of the center console 204, the communication of NFC signals between the portable device 104 and the NFC antenna 108 are efficiently communicated to the NFC transceiver 106.

Based on the communication of the NFC signals, the NFC handshake may be established between the NFC transceiver 126 of the portable device 104 and the NFC transceiver 106. As discussed above, in one embodiment, the pairing of the portable device 104 and the vehicle 102 to initiate a Bluetooth® connection via the Bluetooth® communication protocol may occur that is established between the portable device 104 and the vehicle 102 based on the NFC handshake between the NFC transceiver 126 of the portable device 104 and the NFC transceiver 106.

III. Processes Associated with the System

Figure 7:
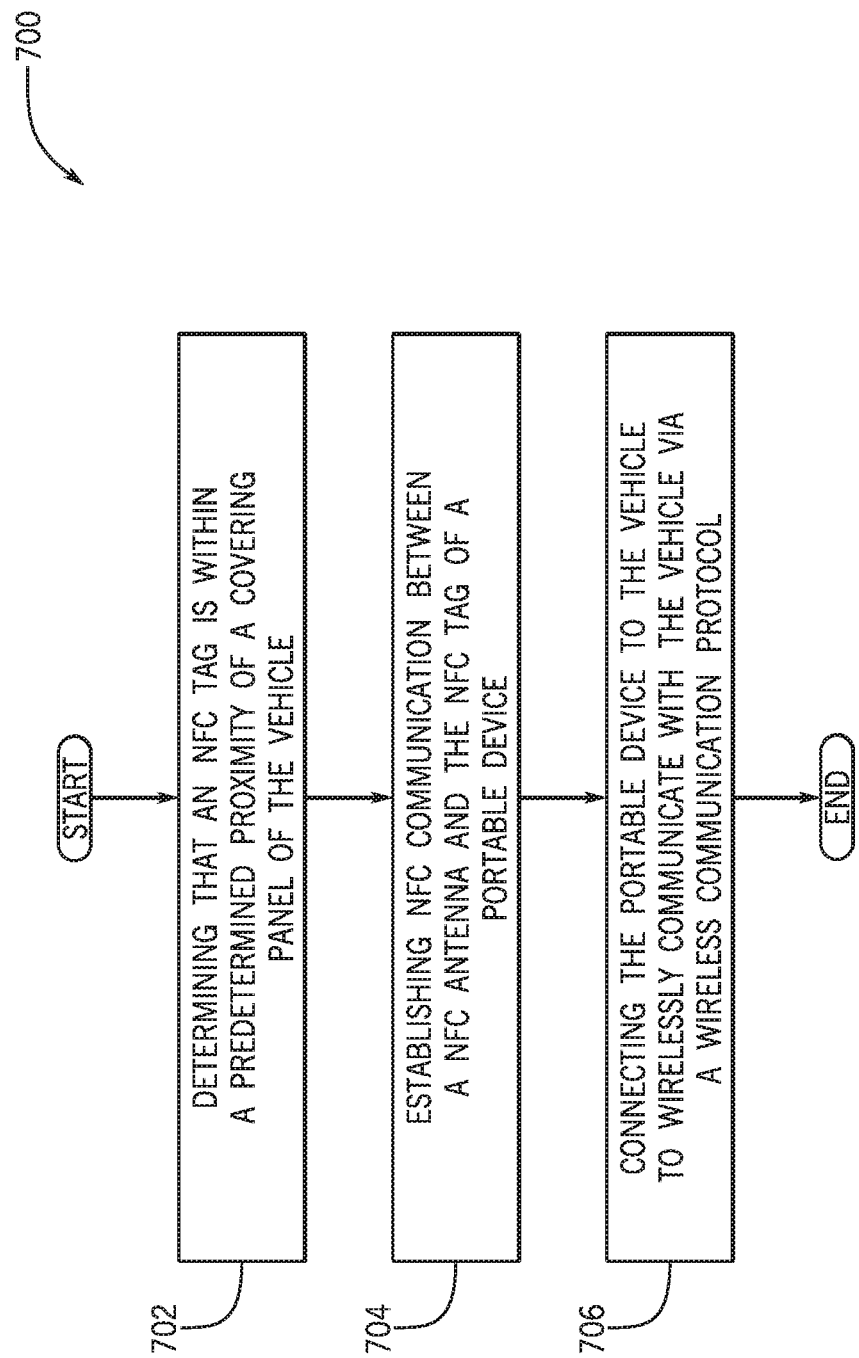
FIG. 7 is process flow diagram of a method for providing the near-field communication within the vehicle according to an exemplary embodiment.

FIG. 7 is process flow diagram of a method 700 for providing the near-field communication within the vehicle 102 according to an exemplary embodiment. The method 700 will be described with reference to the components of FIG. 1-FIG. 6B though it is to be appreciated that the method 700 of FIG. 7 may be used with other systems and/or components. The method 700 may begin at block 702, wherein the method 700 may include determining that an NFC transceiver 126 is within a predetermined proximity of the covering panel 202 of the vehicle 102.

The method 700 may proceed to block 704, wherein the method 700 may include establishing NFC communication between a NFC antenna 108 and the NFC transceiver 126 of a portable device 104. In one embodiment, a top plan view of the NFC antenna 108 has a polygonal shape to conform to one or more interior portions 502 of the covering panel 202. The method 700 may proceed to block 706, wherein the method 700 may include connecting the portable device 104 to the vehicle 102 to wirelessly communicate with the vehicle 102 via a wireless communication protocol.

FIG. 8 is a process flow diagram of a method 800 for providing a communication system for a vehicle 102 according to an exemplary embodiment. The method 800 will be described with reference to the components of FIG. 1-FIG. 6B though it is to be appreciated that the method 800 of FIG. 8 may be used with other systems and/or components. The method 800 may begin at block 802, wherein the method 800 may include providing a NFC antenna module 402 that is mounted to a support structure 604 of the vehicle 102.

The method 800 may proceed to block 804, wherein the method 800 may include providing a PCB 302 that is disposed within the NFC antenna module 402. The method 800 may proceed to block 806, wherein the method 800 may include providing a NFC transceiver 106 that is disposed on the PCB 302.

The method 800 may proceed to block 808, wherein the method 800 may include providing a NFC antenna 108 that is operably connected to the NFC transceiver 106 and is disposed on the PCB 302. In one embodiment, a top plan view of the NFC antenna 108 has a polygonal shape (e.g., an irregular polygonal shape) to conform to at least one interior portion 502 of the covering panel 202 of the vehicle 102. In another embodiment, at least one side of the NFC antenna 108 is conforming in shape to at least one interior portion 502 of the covering panel 202 of the vehicle 102. In an additional embodiment, at least one clearance is included between the NFC antenna and the covering panel of the vehicle 102. The clearance may be governed according to the clearance ratio. As stated above, the clearance ratio may pertain to a ratio of the area 218 that includes the NFC antenna 108 and the area 220 surrounding the NFC antenna 108 to the area 218 including the NFC antenna 108.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A communication system for a vehicle comprising:
    a near-field communication (NFC) antenna module mounted to a support structure of the vehicle;
    a printed circuit board (PCB) that is disposed within the NFC antenna module;
    a NFC transceiver that is disposed on the PCB; and
    a NFC antenna that is operably connected to the NFC transceiver and is disposed on the PCB, wherein a top plan view of the NFC antenna has a polygonal shape to conform to at least one interior portion of a covering panel of the vehicle, wherein the NFC antenna module is configured to hold the PCB and the NFC antenna adjacent to the at least one interior portion of the covering panel of a center console of the vehicle.

2. The communication system of claim 1, wherein the top plan view of the NFC antenna has an irregular polygonal shape.

3. The communication system of claim 1, wherein the top plan view of the NFC antenna has a pentagonal shape.

4. The communication system of claim 1, wherein a top plan view of the PCB has a polygonal shape to conform to the at least one interior portion of the covering panel.

5. The communication system of claim 1, wherein the support structure and the covering panel are part of a front center console of a dashboard of the vehicle.

6. The communication system of claim 5, wherein the front center console includes a column portion and a lateral portion, and the NFC antenna module is mounted at an intersection of the column and lateral portions.

7. The communication system of claim 6, wherein the NFC antenna is located on each of the column portion and the lateral portion of the front center console.

8. The communication system of claim 6, wherein the NFC antenna module is mounted directly to the support structure.

9. The communication system of claim 6, wherein the support structure includes a platform for mounting the NFC antenna module, wherein at least a portion of the platform is configured to collapse.

10. The communication system of claim 1, wherein the top plan view of the PCB and the NFC antenna are complementary in shape to the at least one interior portion of the covering panel.

11. A system for providing near-field communication (NFC) within a vehicle comprising:
    a NFC antenna module that is mounted to a support structure of the vehicle and is covered by a covering panel of the vehicle;
    a printed circuit board (PCB) that is disposed within the NFC antenna module;
    a NFC transceiver that is disposed on the PCB; and a NFC antenna that is operably connected to the NFC transceiver and is disposed on the PCB, wherein at least one side of the NFC antenna is conforming in shape to at least one interior portion of the covering panel of the vehicle and at least one side of the NFC antenna is non-conforming in shape to at least one interior portion of the covering panel of the vehicle.

12. The system of claim 11, wherein the NFC antenna is configured as at least one electrically conductive trace that is configured in at least one loop.

13. The system of claim 12, wherein at least one side of the at least one electrically conductive trace is conforming in shape to at least one interior portion of the covering panel of the vehicle and at least one side of the at least one electrically conductive trace is non-conforming in shape to at least one interior portion of the covering panel of the vehicle.

14. The system of claim 11, wherein at least two sides of the NFC antenna are conforming in shape to at least two interior portions of the covering panel of the vehicle and at least two sides of the NFC antenna are non-conforming in shape to at least two interior portions of the covering panel of the vehicle.

15. The system of claim 11, wherein at least one side of the PCB is conforming in shape to at least one interior portion of the covering panel of the vehicle and at least one side of the PCB is non-conforming in shape to at least one interior portion of the covering panel of the vehicle.

16. A near-field communication (NFC) system for a vehicle comprising:
   a NFC antenna that is disposed upon or in proximity to at least one interior portion of a covering panel of the vehicle, wherein the NFC antenna is configured as at least one electrically conductive trace that is configured in at least one loop; and
   a clearance that is included between the NFC antenna and the covering panel of the vehicle and is governed by a clearance ratio, wherein the clearance ratio includes a ratio of an area that includes the NFC antenna and an area surrounding the NFC antenna to the area that includes the NFC antenna, wherein the clearance ratio is 3:1 or is less than 3:1.

17. The system of claim 16, wherein the area that includes the NFC antenna includes a total area that is enclosed by at least one internal portion of the at least one electrically conductive trace.

18. The system of claim 16, wherein the area that is surrounding the NFC antenna is an area that is between the at least one external portion of the at least one electrically conductive trace and at least one interior portion of the covering panel.

19. The system of claim 16, wherein the clearance ratio is 2:1.

20. The system of claim 16, wherein the clearance ratio is 1.5:1.

* * * * *